July 19, 1949.  A. W. GALBRAITH  2,476,656
THREADED TUBULAR STRUCTURE
Filed Dec. 4, 1945  2 Sheets-Sheet 1
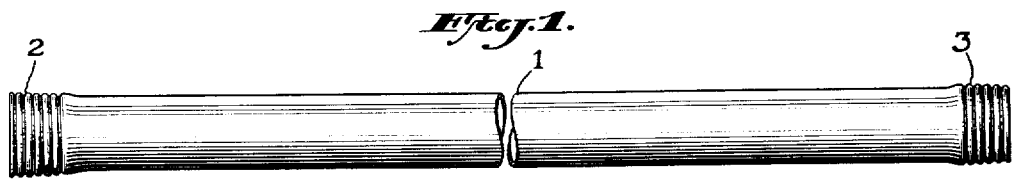
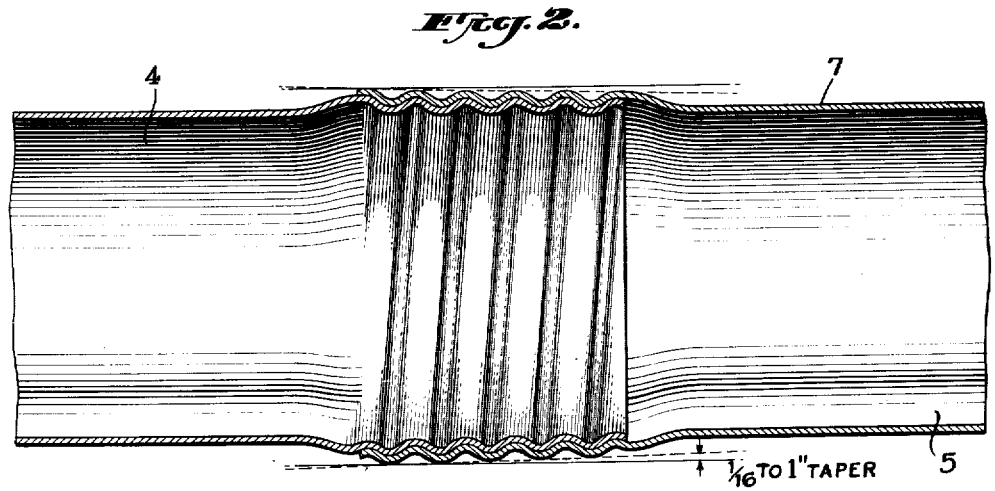
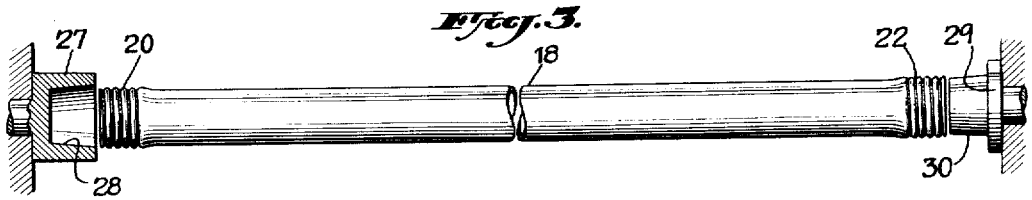
INVENTOR.
ALEXANDER W. GALBRAITH.
BY
ATTORNEYS.

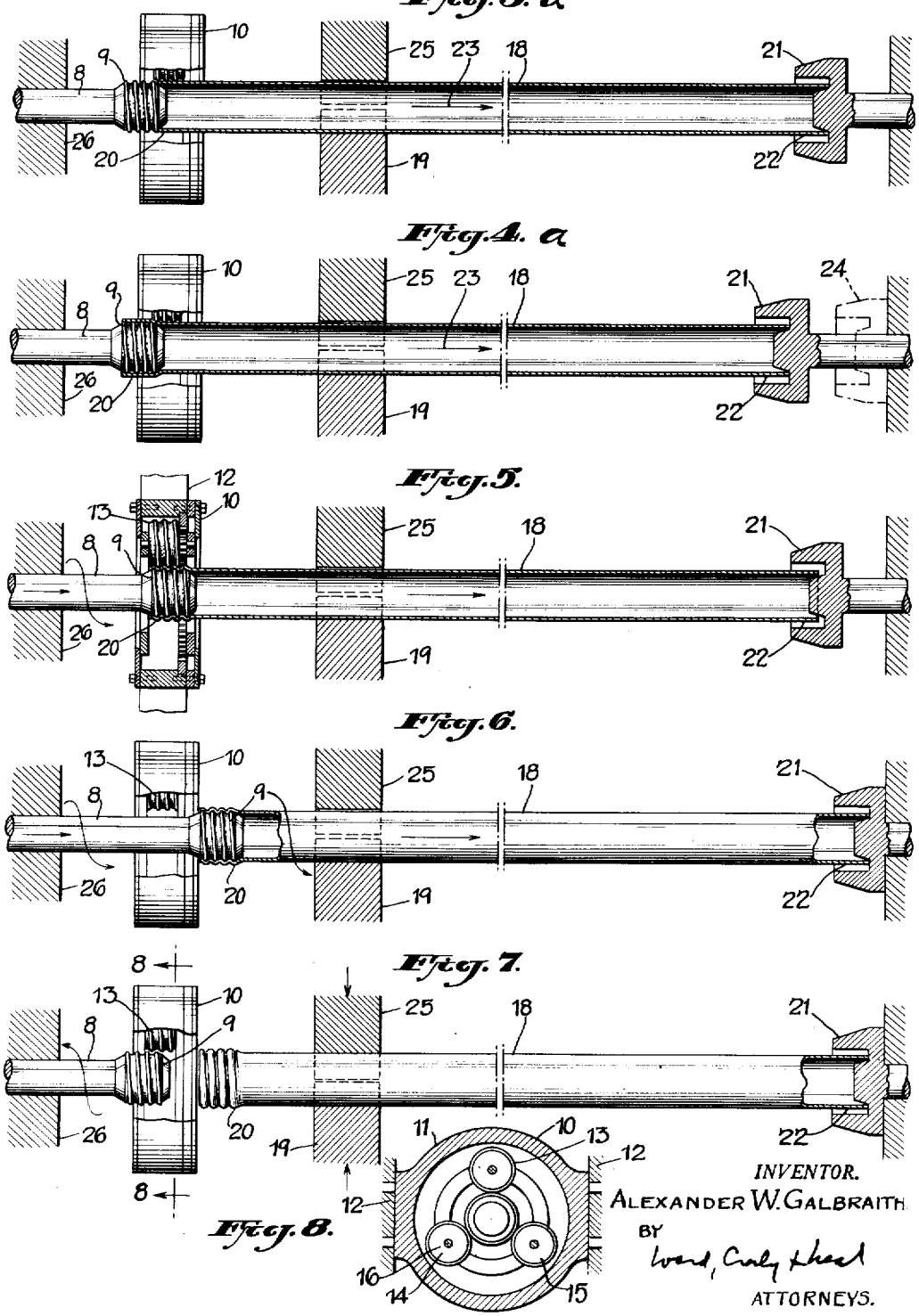

Patented July 19, 1949

2,476,656

UNITED STATES PATENT OFFICE 2,476,656

THREADED TUBULAR STRUCTURE

Alexander William Galbraith, Houston, Tex.

Application December 4, 1945, Serial No. 632,688

2 Claims. (Cl. 285—146)

This invention pertains to metal tubes of steel, copper, brass, aluminum, duraluminum, or other metal capable of being formed under pressure, the opposite ends of which tube are provided respectively, with equally and oppositely tapered, rolled-in threads of substantially uniform wall thickness corresponding to that of the body of the tube, said threaded ends being of enhanced strength due to cold working, and providing a means for detachably uniting successive tubes in substantially fluid-tight joints without the necessity for intermediate threaded coupling members. The invention also pertains to novel methods and apparatus for providing said metal tubes with threaded terminations as aforesaid.

Difficulties have been encountered in the past in devising suitable constructions for detachably joining metal pipes or other metal tubes in fluid-tight connections. The usual procedure is to provide the pipe or tube terminations with cut threads, and to join successive sections by means of internally threaded pipe couplings. The cutting of such threads, however, by reducing the wall thickness of the tubular stock in the threaded portion, thereby weakens the construction. In addition, the necessity for employing in conjunction therewith the threaded couplings is expensive, first, by reason of the necessity for and expense of the coupling itself; and, second, by reason of the two threading operations required, viz., the external threading of the pipe ends and the internal threading of the couplings. The use of such cut threads obviously limits the permissible wall thickness of the tubular stock which may be employed in any particular installation, and, conversely, necessitates the employment in the body or non-threaded portion of the stock, of a greater wall thickness than would otherwise be required.

In accordance with my invention, I propose to eliminate the difficulties aforesaid, while at the same time actually increasing the strength at the joint by providing the opposite ends of the metal tubes respectively, with equally and oppositely tapered, rolled-in threads, such that the wall thickness in the threaded portion is in no wise reduced, but is maintained the same as that of the body of the tube proper, and wherein the cold working which results from the threading and tapering of the end portions of each tube, actually enhances the strength of the metal in the threaded portions, whereby with my invention, the metal at the joint is actually stronger than in the body of the tube, in marked contrast to prior constructions employing cut threads.

By means of these improvements, I am able to employ, for any particular installation, metal tubing of considerably reduced wall thickness as compared to prior constructions employing cut threads, this by reason of the cumulative effect of the two factors above stated, namely, the avoidance of any reduction in wall thickness in the threaded portion, and the enhancement in strength at the joint due to cold working of the metal thereat.

In accordance with the preferred embodiment of the invention, the metal in the threaded portions of each tube is slightly expanded in diameter, prior to threading and tapering, over the diameter of the main body of the tube, and to such an extent that the threaded junction formed by detachably uniting two of the threaded and tapered finished articles will have about the same internal diameter as the main body of the tube, i. e., there will be no reduction or constriction in diameter at the threaded joint, and hence no obstacle to the passage of fluids or other materials therethrough.

In my preferred process for making the article above described, a section of steel, brass, copper, or other cold deformable metal tubing, is placed upon an arcuate support and the end thereof advanced axially over the threaded end of a threading mandrel of slightly greater diameter, thereby slightly to expand or flare the end of the tube over the axial length thereof which it is desired to thread. This forcing of the end of the tube over the threading mandrel may be accomplished by means of an hydraulic ram engaging the opposite end, the threading mandrel being meantime stationarily positioned. When the end of the tube has thus been advanced a sufficient distance over the mandrel to flare the end of the tube over the desired axial extent, the hydraulic ram is withdrawn and the threading mandrel, carrying with it the tube, is advanced in threading relation, i. e. by concurrent axial advance and rotation, through the aperture of an external, stationary, roll-threading die, whereby, by co-action between this external roll-threading die and the threading mandrel advancing the tube therethrough, a thread is rolled on the expanded or flared end of the tube. When the threading mandrel, carrying with it the tube, has thus advanced completely through the stationary roll-threading die, the tube is gripped in a clamp to hold it stationary, and the direction of rotation of the threading mandrel reversed and the mandrel concurrently axially withdrawn from threading engagement with the threaded end of the tube, whereupon the threading operation for this end of the tube is complete. The opposite end of the tube is thereupon expanded and threaded by an identical procedure. The tube, with both ends thus expanded and threaded, is now placed between a tapered die and a tapered mandrel, and the die and mandrel advanced toward each other, as for example by means of an hydraulic ram, thereby to force the tapered mandrel into one threaded end of the tube, while the opposite threaded end thereof is concurrently forced into the tapered cavity of the die. In consequence of this operation, the threaded end of the tube which enters the die has imparted thereto a taper which extends inwardly toward the end thereof, while the opposite threaded end of the tube, which is penetrated by the tapered mandrel, has imparted thereto an equal and opposite taper which extends outwardly toward the end thereof. By reason of the tapered configurations thus imparted to the threaded ends, the inwardly tapering threaded end of one tube is adapted to be threaded into the outwardly tapering end of a similar tube, to form the aforesaid fluid-tight joint.

Having thus generally described the preferred embodiment of my invention as to the novel product and the novel method for producing the same, reference will now be made, for a more detailed description, to the annexed drawings wherein:

Figure 1 is a plan view of a metal tube, the opposite ends of which are provided respectively with equally and oppositely tapered, rolled-in threads, in accordance with the preferred embodiment of my invention.

Figure 2 is a view in axial section through the joint of two metal tubes in accordance with my invention, as detachably united.

Figures 3 to 7 inc. are plan views, partially in section, illustrating the successive steps of my novel process for rolling the threads into the metal tubes. Figure 8 is a view in elevation of the stationary external threading die illustrated in side view in Figures 3 to 7 inc., employed in the threading operation as described more in detail hereinafter.

Figures 9 and 10 are plan views of the successive steps employed in my process for imparting equal and opposite tapers to the threaded ends of the metal tubes.

Referring to Figure 1, there is shown a metal tube 1, the opposite ends 2, 3 of which are provided respectively with expanded and oppositely tapered, complementary rolled-in threaded terminations, terminus 3 being provided with a reduced taper toward the end, and the opposite terminus 2 being provided with a corresponding increased taper toward the end, whereby successive tubular members, like those of Figure 1, may be detachably united in a substantially fluid-tight joint, in the manner illustrated in Figure 2. In Figure 1, the degree of taper of the threaded ends is exaggerated, for purposes of illustration, the actual taper being more in line with that illustrated in Figure 2.

Referring to Figure 2, there is illustrated at the left, one threaded end of a tubular member 4, in accordance with my invention, corresponding to the end 3 in Figure 1, viz., the end having a reduced taper toward the end; while, at the right in Figure 2, there is illustrated the opposite threaded end of another tubular member 5 of similar construction and corresponding to the end 2 of Figure 1, having an increased taper toward the end. As shown in Figure 2, the end of the member 4 having reduced taper is adapted to thread into the oppositely tapered end of the tubular member 5, to provide the aforesaid substantially fluid-tight joint.

It will be observed from the cross-sectional showing of Figure 2, that the wall thickness of the tube stock in the threaded portion, as at 6, is substantially constant, and the same as that in the body portion 7 of the tubular member proper. That is to say, in the formation of the threads, no metal has been cut away, and also there is no substantial variation in wall thickness of the metal in the threaded portion, as compared to the body portion of the tube. In other words the wall thickness of the metal in the crest, root and sides of the threads is substantially equal to the wall thickness of the metal in the non-threaded or body portion of the tube. It will be further observed that, by virtue of the complementary tapers imparted in the threaded portions of the members 4, 5 thus detachably united, a locking action occurs at each thread, whereby the aforesaid fluid-tight joint is secured.

Referring now to Figures 3 to 8 inc. for a detailed explanation as to my preferred method for forming the threads, referring for the moment to Figure 3, there is shown a mandrel 8 provided with a threaded head 9 adapted to cooperate with a stationary external roll-threading die 10, to roll the threads in the tubular stock as explained below. The stationary roll-threading die 10, as shown more in detail in Figure 8, comprises a circular frame 11 stationarily mounted on rigid supports 12, and within which one or more roll-threading dies, such as at 13, 14, 15, are rotatably supported on shafts, such as 16, carried by the frame 11. As illustrated more in detail in Figure 5, each of the roll-threading dies, such as 13, is provided on its periphery with a threaded form which is complementary to the threaded form 9 on the threading mandrel 8. The threaded portion 9 of the threading mandrel 8 is of slightly greater diameter than the internal diameter of the metal tube 18 to be threaded.

Prior to the threading operation, the threading mandrel 8 is positioned to the left of the stationary roll-threading die 10 in the relative position thereto shown in Figure 3, while the metal tube 18 is positioned to the right of stationary die 10 on an arcuate support 19. One end 20 of tube 18 is thereupon forced over the threaded portion 9 of mandrel 8 by means of a power actuated ram 21 engaging the opposite end 22 of tube 18, which ram may be actuated by any suitable means such as hydraulic pressure, compressed air, etc., and in such manner as to exert continuous pressure on the tube 18 in the direction indicated by the arrow 23, until the end 20 of the tube has been forced over the threaded portion 9 of the mandrel 8 from the initial position shown in Fig. 3 to the final extent illustrated in Figure 4, i. e. the extent over which it is desired to thread the end 20. It will be observed that, as a result of this operation, the end 20 of tube 18 has been expanded or flared outwardly to a slight degree as compared to the remainder or main body portion of tube 18. When the end 20 of tube 18 has thus been expanded or flared over the desired axial length, depending on the length over which the threading is required, the pressure exerted by the hydraulic ram 21 is released by withdrawal of the ram 21 to the position 24, Figure 4.

Referring to Figure 5, the threading mandrel 8, carrying with it the tube 18, is now rotated and concurrently advanced, as indicated by the arrows 26, actuated, for example, by means of a power-driven lathe, whereupon the outer surface of the expanded portion 20 of tube 18 engages the form-threaded rolls 13, 14, 15 of the stationary roll-threading die 10, while at the same time the threaded portion 9 of the mandrel engages the inner surface of the expanded portion 20 of the tube in such manner that, by the co-action between the threaded portion of the mandrel and the form-threaded rolls on the stationary threading die, threads are rolled into expanded section 20 of the tube in the manner illustrated in Figure 5, the concurrent rotation and advancement of the mandrel, from the power source, being appropriately adjusted to carry out this operation.

The aforesaid advancement of mandrel 8 is continued until the mandrel, carrying with it the tube 18, has advanced to the position shown in Figure 6, in which the threaded end 9 of the mandrel has moved completely to the right of the stationary threading die 10. At this point, an upper clamping member 25 cooperating with the tube support 19 is operated, thereby to grip the tubular member 18 between members 19, 25, whereupon the power drive on the threading mandrel 8 is reversed causing the mandrel to be withdrawn to the left and concurrently rotated, as indicated by arrows 26, Figure 7, thereby to disengage the mandrel from the threaded portion 20 of the tubular member, as shown in Figure 7, this operation continuing until the threading mandrel 8 has reassumed the position shown in Figure 3.

Identically the same sequence of operations as above described is now performed on the opposite end of the tube 18, thereby to expand and thread the opposite end 22 thereof. The thus threaded tubular member then has the appearance shown in Figure 9.

The so-threaded tubular member 18 is now placed between a tapered die 27 having a tapered cavity 28, and a mandrel 29 having a similarly tapered stud 30, and pressure exerted between the mandrel and the die by any suitable means, as for example by means of an hydraulic ram, compressed air, power driven screw feed, etc. This pressure is continued until the threaded end 20 of tube 18 has been forced sufficiently into the cavity 28 of the die, and until the stud 30 of the mandrel has sufficiently penetrated the threaded end 22 of tube 18 to oppositely taper these ends, as illustrated in Figure 10. In consequence of this operation, the left end 20 of the tubular member has imparted thereto a reduced taper toward its end, while the opposite end 22 of the tubular member has imparted thereto a complementary increasing taper toward its end. At this point in the sequence of operations, the mandrel 29 is withdrawn by release from the hydraulic pressure and the tubular member 18 removed from the die, resulting in the finished structure as illustrated in Figure 1.

Although the above describes the preferred modification of my invention, and the preferred process for making the same, various other modifications are possible. For example, the tubular member may be provided with non-tapered threaded ends, by expanding and threading one end as illustrated in Figures 3 to 7 inc., while threading the opposite end without expansion, in which event the non-expanded threaded end of one tubular member will thread into the expanded and threaded end of another tubular member, thereby to form the joint. Another modification would comprise expanding both ends, one slightly more than the other, followed by threading, to provide a threaded telescoping joint. In another possible modification, the two ends of the tubular member may be threaded without expanding the diameter of the end portions, followed by the imparting of equal and opposite tapers to the ends so threaded, in the manner illustrated in Figures 9 and 10. In this modification, the opposite tapers imparted to the two threaded ends, are the means by which the end of one tubular member having decreasing taper may be threaded into the opposite end of another member having increasing taper.

Slight changes in the method above described for making my preferred modification of the invention are entailed in producing the modified structures above mentioned. For example, the rolling of a thread into a non-expanded terminus of a tubular member is best effected by employing an external roll-threading die having a roll-disengaging construction for disengaging the thread when finished, this being accomplished, for example, by the use of self-closing rollers on the external die; and by further employing a construction of the threading mandrel adapted to disengage the threads, such for example as a collapsible mandrel, or one having threading rolls which can be disengaged.

The invention is applicable to tubular members made of any metal capable of being formed and shaped under pressure, such as low carbon steel, austenitic stainless steel, copper, brass, aluminum, duraluminum, etc. Ordinarily, the expanding threading and tapering at the ends of the tubular members, in accordance with the invention, are carried out by cold working the metal; although my invention does not preclude carrying out these operations at elevated temperatures, particularly where tubular members of considerably wall thickness are required for any particular installation. A marked advantage of carrying out these operations on the metal "in the cold" is that the metal at the joint is thereby cold worked, and correspondingly strengthened as aforesaid, and for this reason I prefer the use of cold-working operations where feasible and applicable. Although the wall thickness of the tubular members is not critical, I find that excellent results are obtained by applying the invention to metal tubes having a wall thickness of, for example $\frac{1}{16}$ to $\frac{1}{8}$ inch, preferably about $\frac{1}{16}$ to $\frac{3}{32}$ inch, although greater or lesser wall thicknesses may be employed. For any given metal, however, the wall thickness should be sufficiently great to provide a relatively rigid tube, and one which will retain its shape at the joints when expanded, threaded and tapered as aforesaid, and thereby be capable of providing the fluid-tight joints where required, although there are, of course, applications where this is not necessary and to which various modifications of my invention are equally applicable.

It is to be understood of course, referring to Fig. 4, that the external roll threading die 10, need not necessarily be held stationary during the threading operation, but may be advanced against the stock by means of a power actuated screw feed in the same fashion as the threading mandrel 8, in which case the threading mandrel could be maintained stationary if desired.

I claim:

1. A cylindrical tube of substantially uniform wall thickness throughout, made of metal capable of being formed under pressure, said tube being provided at each end with a complementary external and internal, rolled-in, threaded terminus of sinuous form in longitudinal section and of substantially uniform wall thickness throughout, corresponding to that of the body of the tube, said threaded portions being work-hardened throughout and of enhanced strength, and the threaded terminus at one end being adapted to threadedly engage the threaded terminus at the opposite end of a similarly constructed tube.

2. A cylindrical tube of substantially uniform wall thickness throughout, made of metal capable of being formed under pressure, said tube being provided at each end with a complementary external and internal, rolled-in, threaded terminus of sinuous form in longitudinal section and of substantially uniform wall thickness throughout, corresponding to that of the body of the tube, the threaded portions at the opposite ends having imparted thereto equal and opposite tapers, whereby the threaded portion at one end is adapted to threadedly engage, in a substantially fluid tight joint, the threaded portion at the opposite end of a similarly constructed tube, and the metal in said threaded portions being sufficiently expanded in diameter compared with the body of said tube, to provide a threaded joint as aforesaid, having a minimum diameter corresponding substantially to the internal diameter of the body of said tube, and the metal in said threaded portions being work hardened throughout and of enhanced strength.

ALEXANDER WILLIAM GALBRAITH.

REFERENCES CITED

The following references are of record in the file of this patent:

UNITED STATES PATENTS

| Number | Name | Date |
|---|---|---|
| 613,903 | Hussey | Nov. 8, 1898 |
| 1,365,884 | Bayne | Jan. 18, 1921 |
| 1,465,848 | Richter | Aug. 21, 1923 |
| 1,733,455 | Ferraud | Oct. 29, 1929 |
| 2,025,973 | Cornell | Dec. 31, 1935 |
| 2,137,797 | Berger | Nov. 22, 1938 |
| 2,145,587 | Draper | Jan. 31, 1939 |
| 2,261,056 | Dunn | Oct. 28, 1941 |
| 2,390,533 | Hill | Dec. 11, 1945 |